United States Patent
Hahn et al.

[15] 3,635,026
[45] Jan. 18, 1972

[54] MOTOR VEHICLE DRIVE WITH A HYDRODYNAMIC TORQUE CONVERTER AND HYDRAULICALLY OPERABLE CLUTCHES

[72] Inventors: Wilhelm Hahn, Bergisch-Gladbach; Helmuth Hoffmann, Refrath-Lustheide, both of Germany

[73] Assignee: Klockner-Humboldt-Deutz Aktiengesellschaft, Cologne-Deutz, Germany

[22] Filed: Dec. 4, 1969

[21] Appl. No.: 882,162

[30] Foreign Application Priority Data

Dec. 5, 1968 Germany..................P 18 12 840.0

[52] U.S. Cl..............................................60/54, 60/DIG. 5
[51] Int. Cl........................................................F16d 31/06

[58] Field of Search...........................................60/54, DIG. 5

[56] References Cited

UNITED STATES PATENTS

| | | | |
|---|---|---|---|
| 3,063,245 | 11/1962 | Rippy | 60/54 |
| 3,212,360 | 10/1965 | Fisher et al. | 60/54 X |
| 3,255,590 | 6/1966 | Tipping et al. | 60/54 X |

*Primary Examiner*—Edgar W. Geoghegan
*Attorney*—Walter Becker

[57] ABSTRACT

A vehicle drive with a hydrodynamic torque converter and hydraulically controlled clutches and brakes, in which the control pressure fluid conveyed to the means for actuating said clutches and brakes is controlled automatically in conformity with the respective torque exerted by the hydrodynamic torque converter.

5 Claims, 3 Drawing Figures

PATENTED JAN 18 1972　　　　　　　　　　　　　　　3,635,026
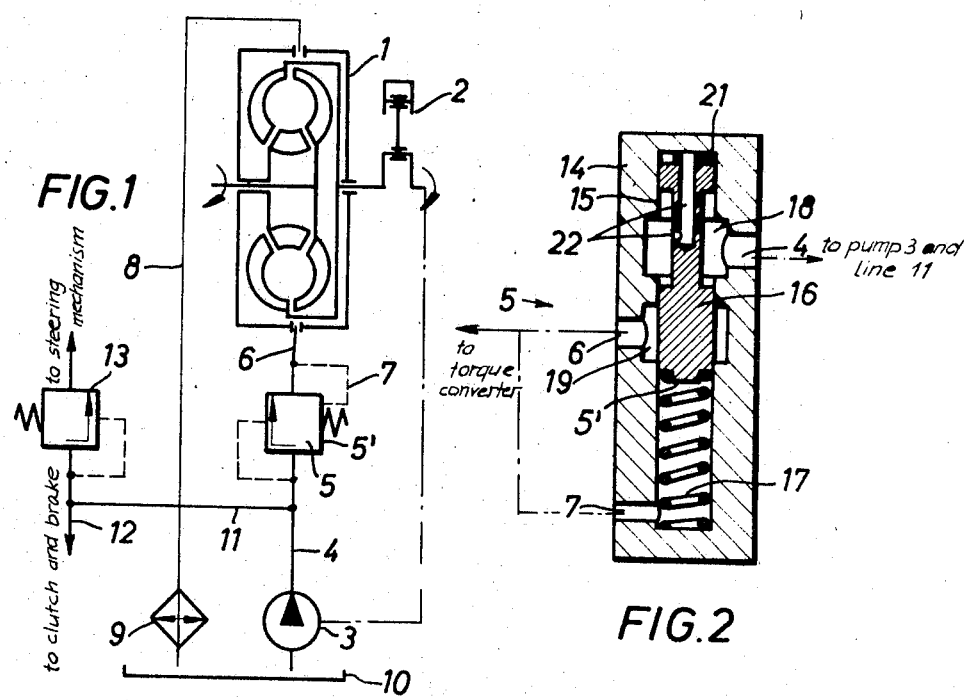
FIG.1
FIG.2
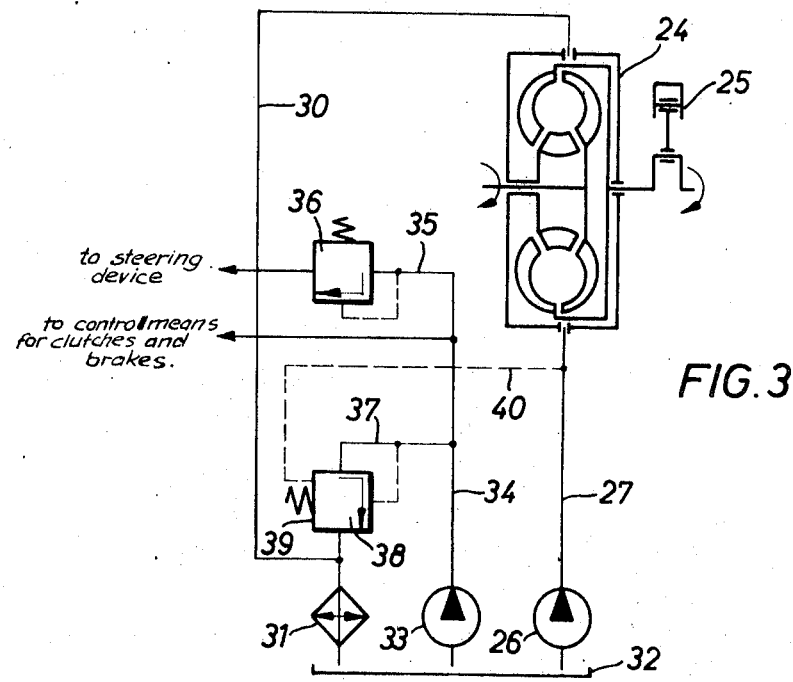
FIG.3
INVENTORS:
Wilhelm Hahn
Helmuth Hoffmann
BY
Walter Becker

MOTOR VEHICLE DRIVE WITH A HYDRODYNAMIC TORQUE CONVERTER AND HYDRAULICALLY OPERABLE CLUTCHES

The present invention relates to a vehicle drive, especially for a track laying vehicle, which comprises a hydrodynamic torque converter and hydraulically engageable clutches or brakes for the transmission and/or for a steering device, while the torque converter is continuously supplied with pressure fluid from a pump for cooling purposes and while furthermore a spring-loaded relief valve is connected to a conduit supplying the clutches or brakes with the pressure fluid.

For actuating clutches or brakes for purposes of controlling velocity ranges and/or for steering purposes, it is necessary that the hydraulic pressure is always so high that, when transmitting the maximum torque, an undesired and wear causing slip of the corresponding clutch or brake will be safely avoided. This requirement calls for a high operating pressure even though for normal operation a considerably lower pressure would be fully sufficient. Thus, during the operation, for purposes of obtaining the said high pressure, continuously a high power has to be produced which, however, is required only at peak loads but otherwise is lost as wasted heat through a relief valve.

With heretofore known vehicle drives, the hydrodynamic torque converter has connected thereto a blade wheel which rotates at the output speed of the torque converter. The accumulating pressure produced by the blade wheel in conformity with the speed serves as control pressure for corresponding control elements which determine the respective pressure for actuating the clutches or brakes. Thus, according to this vehicle drive, the output speed of the torque converter is taken into consideration for the operating pressure in the clutches. Actually, however, the respective torque to be transmitted should determine the operating pressure of the clutches.

It is, therefore, an object of the present invention to improve a vehicle drive of the above mentioned type in such a way that the hydraulic clutches or brakes will be applied for safe operation but not unduly strongly and, more specifically, with a pressure the height of which is determined by the respective torque to be transmitted.

This object and other objects and advantages of the invention will appear more clearly from the following specification in connection with the accompanying drawings, in which:

FIG. 1 is a diagrammatic illustration of a hydrodynamic torque converter having a supply pump which through a relief valve supplies the clutches or brakes in conformity with the torque.

FIG. 2 illustrates a section through a pressure relief valve for use in connection with the invention.

FIG. 3 is a diagrammatic illustration of a hydrodynamic torque converter in a vehicle drive in which for purposes of supplying the torque converter there is provided a first pump, and for purposes of supplying the clutches or brakes in conformity with the torque there is provided a second pump.

The vehicle drive according to the present invention is characterized primarily in that the supply line of the torque converter communicates with the spring-loaded end face of the pressure relief valve directly in front of the torque converter, while the said valve is in communication with a conduit which conveys the pressure fluid to the hydraulically engageable clutches or brakes. Such an arrangement makes it possible by simple means, through the torque converter input pressure which substantially rises or drops proportionally with regard to the torque to be conveyed, to control the operating pressure for the clutches or brakes in conformity with the torque. Since the operating pressure for the clutches or brakes always reaches only the height necessary for a safe torque transmittal, undue heat development and thus increased power losses will be avoided.

If the supply of the torque converter and the hydraulically engageable clutches or brakes is effected by one pump only, it is provided in conformity with the present invention that the pressure relief valve is controlled between the pressure fluid pump and the torque converter and has its spring-loaded end face connected to the supply line leading to the torque converter, and that the supply line between the pump and the relief valve is through corresponding control elements connected to the hydraulically engageable clutches or brakes.

If a vehicle drive, for purposes of supplying pressure fluid to the torque converter on one hand and for supplying pressure fluid to the hydraulically engageable clutches or brakes on the other hand, is provided with two pumps respectively, the present invention provides that the pressure relief valve which communicates with the supply line for the clutches or brakes has its spring-loaded end face directly connected to the supply line of the torque converter.

Referring now to the drawing in detail, the arrangement shown in FIG. 1 comprises a hydrodynamic torque converter 1 driven by an internal combustion engine 2. For purposes of supplying the torque converter 1 with pressure or cooling means there is provided a pump 3 which through a conduit 4 communicates with a pressure relief valve 5. Valve 5 in its turn communicates through a supply line 6 with the torque converter 1. From the spring-loaded end face 5 of the pressure relief valve 5, a control conduit 7 leads to the supply line 6. For returning the pressure fluid delivered by the pump 3 to the torque converter 1, there is provided a conduit 8 which, for instance, through a cooler 9 is connected to the pressure fluid reservoir 10. A conduit 11 branches off from the conduit 4, said conduit 11 leading on one hand through a conduit 12 to control members (not illustrated) for the clutches or brakes of the transmission and on the other hand through a relief valve 13 communicates with the likewise not illustrated control members for the steering mechanism.

The pressure relief valve 5 is expediently designed as shown in FIG. 2. In a valve body 14 there is provided a closure member or spool 16 which is axially displaceable in a guiding bore 15. Spool 16 rests against the valve body through a pressure spring 17. The guiding bore 15 has annular chambers 18 and 19. The annular chamber 18 communicates with conduit 4 whereas the annular chamber 19 communicates with conduit 6. The spring-loaded end face 5' of the closure body 16 communicates with the control conduit 7. Furthermore, that end face 21 of the closure body 16 which faces away from the pressure spring 17 communicates with the annular chamber 18 through bores 22.

The device illustrated in FIG. 1 and equipped with a pressure relief valve according to FIG. 2 operates in the following manner. When the internal combustion engine 2 is in operation, in addition to the torque converter 1, also the pump 3 is driven. Pump 3 delivers pressure fluid through conduit 4 to the annular chamber 18 of valve 5. The closure body 16 is, in view of the action exerted by the pressure fluid, displaced against the thrust of the pressure spring 17 so that eventually the conduit 4 is in communication with the conduit 6 and the pressure fluid delivered by the pump passes to the torque converter. The pressure fluid heated up in the torque converter passes through the conduit 8 and the cooler 9 back to the pressure fluid reservoir 10. When the torque converter is in operation, the pressure in the supply line 6 changes in conformity with the accumulating pressure of the torque converter substantially proportionally with regard to the respective torque transmitted by the torque converter.

The pressure in the supply line 6 acts through conduit 7 also upon the spring-loaded end face 5' of the closure body 16 in the valve 5. The closure body 16 in the pressure relief valve 5 thus controls the pressure fluid flow between conduits 4 and 6 in conformity with the pressure so that in conduit 4 a pressure is obtained which is proportional to the respective transmitted torque of the torque converter 1. The pressure in the conduit 4 is conveyed through conduit 11 to the hydraulic members following the same for purposes of actuating the clutches or brakes of the transmission and the steering device.

FIG. 3 shows a hydrodynamic torque converter 24 which follows an internal combustion engine 25 and which in order to be supplied with a pressure fluid is provided with a pump 26 which is continuously driven by the internal combustion engine. Pump 26 communicates through a conduit 27 with the torque converter 24. For purpose of returning the heated up pressure medium from the torque converter, there is provided a conduit 30 which through a cooler 31 communicates with the pressure fluid reservoir 32. There is also provided a second pump 33 which is likewise driven by the internal combustion engine 25. Pump 33 is by means of a conduit 34 connected to the nonillustrated control members for the hydraulically engageable clutches or brakes of the transmission. From the conduit 34, a branch line 35 leads through a valve 36 to a steering device while another branch line 37 leads to a pressure relieve valve 38 which has its output side connected to the conduit 30. The spring-loaded end face 39 of the pressure relief valve 38 communicates through a control line 40 with the conduit 27 which supplies the torque converter with pressure fluid.

When the torque converter 24 is operated, the latter continuously receives pressure fluid from pump 26 through conduit 27 while the pressure fluid heated up in the torque converter returns through conduit 30 and cooler 31 to the pressure fluid reservoir 32. During this operation, in the supply line 27 a pressure builds up which is proportional to the torque transmitted by the torque converter 24. The pump 33 which is likewise continuously driven by the engine 25 supplies the clutches or brakes of the transmission and of the steering device with pressure fluid through conduits 34 and 35. The respective pressure prevailing in the clutches or brakes is determined by the pressure relief valve 38 in conformity with the pressure in the supply line 27 inasmuch as the latter is through the control line 40 connected to the spring-loaded end face 39 of the relief valve 38. In this way care is taken that the force at which the clutches or brakes are pressed against each other will be in conformity with the respective torque to be transmitted.

It is, of course, to be understood that the present invention is, by no means, limited to the particular showing in the drawing but also comprises any modifications within the scope of the appended claims.

What we claim is:

1. A vehicle drive, especially for a track laying vehicle, which includes: hydrodynamic torque converter means, pump means for selectively continuously supplying pressure fluid to said torque converter means to cool the same, pressure relief valve means having connection to conduit means arranged for communication with both the pressure side of said pump means and said torque converter means, said pressure relief valve means including a valve spool and spring means acting upon one side of said valve spool to urge the same in a direction to reduce the flow of fluid through said pressure relief valve means, said one side of said pressure relief valve means communicating with said torque converter means and being responsive to the pressure therein, and control conduit means communicating with the connection of said pressure relief valve means with said pressure side of said pump means for connection with control means of said vehicle.

2. A vehicle drive according to claim 1, in which said pump means comprises one pump only, and which includes a supply conduit leading from the pressure side of said pump to said torque converter means and having said relief valve means interposed therein so that said one side of said valve spool has location which in conduit communicates with said hydrodynamic torque converter means, said control conduit means communicating with said supply conduit between said relief valve means and the pressure side of said pump.

3. A vehicle drive especially for a track laying vehicle, which includes: hydrodynamic torque converter means, pump means for selectively continuously supplying pressure fluid to said torque converter means to cool the same, pressure relief valve means having connection to conduit means arranged for communication with both the pressure side of said pump means and said torque converter means, said pressure relief valve means including a valve spool and spring means acting upon one side of said valve spool to urge the same in a direction to reduce the flow of fluid through said pressure relief valve means, said one side of said pressure relief valve means communicating with said torque converter means and being responsive to the pressure therein, control conduit means communicating with the connection of said pressure relief valve means with said pressure side of said pump means for connection with control means of said vehicle, said pump means including a first pump for supplying pressure fluid to said torque converter means and also a second pump, said control conduit means including a first control conduit connected to the pressure side of said first pump and to said torque converter means and also a second conduit connected to the pressure side of said second pump for conveying pressure fluid to control means of said vehicle, said one side of said valve spool communicating with said first conduit.

4. A vehicle drive according to claim 3, which includes additional relief valve means interposed in said second conduit.

5. A vehicle drive according to claim 3, which includes additional conduit means establishing communication between said second conduit and an area of said valve spool which is opposed to said one side of said pressure relief valve means.

* * * * *